United States Patent [19]

Sumner

[11] Patent Number: 4,561,927
[45] Date of Patent: Dec. 31, 1985

[54] APPARATUS FOR THE MANUFACTURE OF TIRES

[75] Inventor: Anthony J. M. Sumner, Welford-on-Avon, England

[73] Assignee: Apsley Metals Limited, London, England

[21] Appl. No.: 603,697

[22] Filed: Apr. 25, 1984

[30] Foreign Application Priority Data

May 10, 1983 [GB] United Kingdom ............... 8312863

[51] Int. Cl.⁴ .......................... B29C 1/12; B29H 5/18
[52] U.S. Cl. .................... 156/406.2; 425/39; 425/51
[58] Field of Search ............ 425/35, 38, 48, 49, 425/51, 52, 53, 45; 156/406.2, 414, 416

[56] References Cited

U.S. PATENT DOCUMENTS

| | | | |
|---|---|---|---|
| 1,643,202 | 9/1927 | Denmire | 156/406.2 |
| 1,777,405 | 10/1930 | Frank | 156/416 |
| 3,044,533 | 7/1962 | Lowe | 156/416 |
| 3,867,231 | 2/1975 | Casey | 156/416 |
| 3,922,188 | 11/1975 | Appleby | 156/416 |

FOREIGN PATENT DOCUMENTS

| | | | |
|---|---|---|---|
| 2149398 | 4/1973 | Fed. Rep. of Germany | 156/416 |
| 907692 | 10/1962 | United Kingdom | |
| 1389563 | 4/1975 | United Kingdom | |

Primary Examiner—Willard E. Hoag
Attorney, Agent, or Firm—Stevens, Davis, Miller & Mosher

[57] ABSTRACT

An apparatus for expanding an annular tire component into a ring comprising an inflatable, expandable annular pressure vessel formed by an inflatable bag or diaphragm attached to a cylindrical carrier drum and guide means for accurately controlling in a predetermined manner the axial position of the bag with respect to the carrier drum. The guide means are preferably radially extending pins sliding in bearings.

9 Claims, 1 Drawing Figure

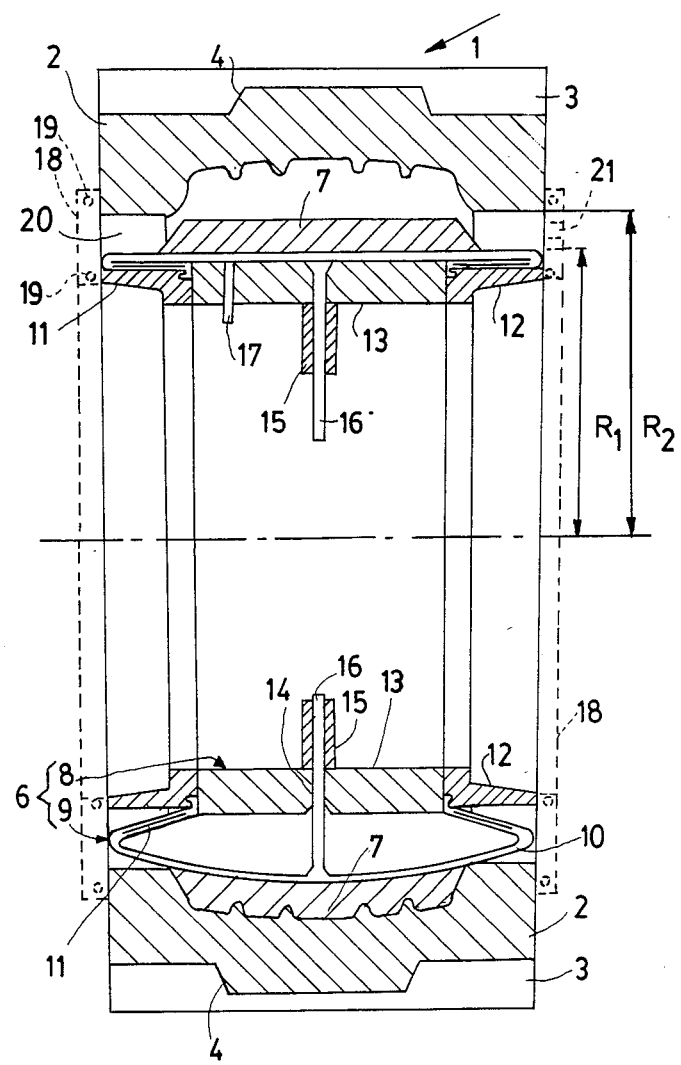

APPARATUS FOR THE MANUFACTURE OF TIRES

This invention relates to the manufacture of pneumatic tires and the apparatus used therefor.

Vehicle tires are assembled from many separate components each of which is required to be precisely located and accurately shaped within the completed tire. Maintaining the required shapes and obtaining sufficient accuracy in the positions of the components is extremely difficult in practice because of the readily deformable nature of the unvulcanized material which is used and the changes in shape which are impressed on the tire during assembly.

Conventionally, tires are assembled or at least partially assembled, on a flat drum and are then shaped up into the required toroidal shape. Subsequently the tread reinforcement and the tread rubber are fitted to complete a patternless green carcass which is then put into a patterned mould where internal pressure is used to push the tread rubber into the mould pattern. In the case of large tires such as truck or earthmover tires large rubber volumes are moved in this final moulding stage. The shaping and moulding stages both cause component movement and component reshaping each of which cannot be precisely controlled and the results are inconsistent tires.

In assignees co-pending U.K. Patent Application No. 8301098 filed Jan. 15, 1983 now superseded by U.K. Patent Application No. 8400822, there is described a method and apparatus for manufacturing vehicle tires which provides effective component location on assembling the tire and retention of component positions on vulcanizing the tire.

The method of building a pneumatic tire described in said application comprises filling the tread cavity of a patterned annular tread mould with unvulcanized tire tread composition so that the tread is formed with the required final pattern and retained thereby in the mould, shaping the radially inner surface of the tread to a first profile having the shape required to accommodate and locate a tread reinforcement breaker, fitting the breaker into the prepared first profile, consolidating the tread and breaker assembly, shaping the radially inner surface of the assembly to a second profile having the shape required to accomodate a tire carcass, positioning the tyre carcass, which is not fully shaped, within and coaxial to the annular tread mould, further shaping the carcass so that the carcass forms a crown which contacts and adheres to the second profile, completing the tyre assembly, vulcanizing the assembled tyre and removing the completed tyre from the tread mould.

In a preferred method the tread cavity is filled by forming the tread composition into a ring upon a support member comprising an inflatable annular air bag or diaphragm positioned on a cylindrical carrier drum remote from the tread mould, moving the support member axially into the mould and inflating the air bag by air pressure to radially expand the support member and effect filling of the tread cavity by pressing the tread composition into the cavity.

We have now found that inflation of the air bag may not always occur in a completely uniform manner, for example the air bag or diaphragm may be distorted or deflected during inflation, with the result that the tread composition is not accurately located in the tread cavity.

The present invention seeks to overcome the abovedescribed disadvantage of the known support members.

Accordingly the present invention provides an apparatus for expanding an annular tyre component into a ring comprising an inflatable, expandable annular pressure vessel formed by an inflatable bag or diaphragm attached to a cylindrical carrier drum and guide means for accurately controlling in a predetermined manner the axial position of the bag or diaphragm with respect to the carrier drum.

The guide means may comprise a plurality of radially extending pins mounted on the carrier drum and attached to the bag at the radially outer end of each pin. The pins may be slidably mounted in the carrier drum or may be telescopic tubes.

The pins may be located entirely within the pressure vessel or may project through seals in the carrier drum.

The inflatable bag or diaphragm is preferably substantially wider than the component to be expanded and includes in the axially outer regions of the bag, i.e. outside the component holding region, additional annular strips of reinforcement material to restrict radial expansion of the bag and cause the bag to expand most rapidly at the centre of the component holding region.

The invention will now be described in more detail, by way of example only, with reference to the accompanying schematic drawing in which:

the single FIGURE is a cross-section of a patterned annular tread mould with the support member being shown in its contracted and inflated conditions in the upper and lower parts of the mould respectively.

The drawing shows a tire-mold in cross-section. A tread mould 1 shown in part in the accompanying drawing is for a truck radial tire and comprises a series of mould segments 2 positioned end-to-end and located within a steel support ring 3 so that the required annular tread mould cavity is formed. The mould segments 2 are locked into place but may be released when required by locking bolts (not shown) and are further located in the support ring 3 by shoulders 4. The radially inner surface of the tread mould segments 2 has a female tread mould pattern 5 for the tire tread to be made.

A support member 6 for filling the tread cavity with the required volume of unvulcanized tread rubber 7 comprises a cylindrical carrier drum 8 and an inflatable annular bag or diaphragm 9 which together form a radially expandable pressure vessel. Mould 1 and drum 8 are coaxially aligned and drum 8 is axially movable by means (not shown) between a first position in which the drum 8 and bag 9 are completely outside the mould 1 and a secnd position in which the drum 8 and bag 9 are within the mould 1.

Bag 9 comprises a band 10 of rubber radially reinforced by a carcass of rayon fabric which extends around the outer surface of the drum 8. Each edge of the band 10 is additionally reinforced by a respective annular fabric strip 11 comprising an assembly of parallel metal cords inclined at an angle of 22° with respect to the mid-circumferential plane of the bag 9. Band 10 has an axial width substantially greater than the axial width of the drum outer surface and is folded back on itself at each edge and clamped to the adjacent end of the drum by means of detachable retaining rings 12. The centre portion of the bag which portion is the component carrying portion, has a cover of elasticated rayon fabric (uncoated) or other non-stick surface layer.

Drum 8 comprises a steel tube 13 formed with a central row of circumferentially spaced holes 14. Each hole 14 is aligned with a respective radially extending guide tube 15 secured to the inner surface of tube 13. Each tube 15 has a respective guide pin 16 slidably mounted therein. Each pin 16 is sealed relative to the associated tube 15, e.g. by means of an O-ring (not shown) and is attached at the radially outer end thereof to the inner surface of the band 10. Drum 8 further includes a valve 17 for the introduction of an inflation medium, e.g. air to inflate the bag 9.

Support member 6 has a minimum radius $R_1$ with bag 9 deflated which is less than the minimum radius $R_2$ of the mould by an amount sufficient to allow the support member 6 and unvulcanized rubber tread strip 7 to be inserted into the mould 1.

Operation of the support member 6 to fill the mould 1 with tread rubber 7 will now be described in more detail. With support member 6 in its first position outside the mould and the bag 9 deflated the required tread strip 7 is applied to the outer surface of the bag, for example, by extruding a strip of unvulcanized rubber which is wound around the band 10 to build up the required tread strip section or by extruding a strip of unvulcanized rubber corresponding to the tread strip section which is wound around the band 10 and joined end-to-end.

The support member 6 carrying the tread strip 7 is then moved axially to its second position within the mould 1 and bag 9 inflated by air introduced via valve 17. This expands the tread strip 7 and presses it against and into the pattern 5 in the mould 1. During inflation of the bag 9 the guide pins 15 accurately locate the bag relative to the pattern and ensure the tread strip 7 is applied precisely centrally to the pattern 5. The edge strips 11 ensure the bag 9 adopts a generally oval shape as shown on inflation so that contact between the tread strip 7 and the mould pattern occurs progressively in an axially outwards direction from the mid-circumferential plane of the tread strip 7 to prevent air entrapment between the tread strip and the mould pattern. When the tread strip is fully pressed into the pattern 5 the bag 9 is deflated and the support member 6 returned to its first position for application of another tread strip 7 for filling the next tread mould 1.

The tread strip 7 inserted in the mould 1 as above-described may be consolidated by a consolidating head and the mould 1 with the tread strip 7 therein advanced to further processing stages for application of additional tire components as described in assignees previously mentioned co-pending Patent Application to which the reader is directed for further details.

It will be understood that the invention is not restricted to the above-described embodiment which may be modified in a number of ways. For example more than one row of circumferentially spaced guide pins may be provided. The bag 9 may be attached to the drum by any suitable means while for certain applications the fabric strips 11 may be omitted. Furthermore, more additional fabric strips may be used to further control the radial expansion and to cause the centre of the bag to expand at any required shape.

In a modification, shown in dotted lines in the accompanying drawing, the risk of air entrapment as the tread strip 7 is pressed into the mould pattern 4 is avoided by sealing the mould 1 relative to the support member 6 when the latter is in its second position by a pair of detachable annular end closure plates 18 each having O-rings 19 engageable with the mould segments 2 and clamping rings 12 respectively and connecting the space 20 between the mould pattern 5 and bag 9 to vacuum via an opening 21 in one of the closure plates 18. As the air pressure in the space 20 is reduced the bag 9 is inflated by atmospheric air pressure via valve 17 to press the tread strip 7 into the mould pattern 4.

In another modification the guide pins and bearings may be placed completely within the pressure vessel so that the pins are not subjected to an inward radial force due to the air pressure acting on the pin area and this obviates the need for seal at each pin.

A source of vacuum may also be provided to assist in fully collapsing the bag prior to positioning the component on the bag.

Also although the invention has been particularly described with reference to the use of the support member 6 for expanding a tread strip 7 to fill a pattern 5 in an annular tread mould 1 it will be understood that the support member may be used to apply, join, shape any annular elastomeric component capable of being expanded radially.

Such component may include a breaker ply or plies. The component carrying portion of the bag may have a cross-sectional profile shaped to fit the component it is carrying or so that it may on finally reaching its fully inflated shape impart a curved and/or stepped shape to the component to accommodate subsequent components on the carcass.

Finally the use of vacuum in the space 20 to inflate the bag is particularly beneficial where several components are to be joined together in sequence in that air entrapment at internal interfaces of the article to be produced, e.g. a tire, which would give rise to serious problems during subsequent vulcanization of the assembled article is avoided.

I claim:

1. An apparatus for expanding an annular tire component into a ring comprising an inflatable expandable annular pressure vessel formed by a radially extensible annular inflatable diaphragm attached to a cylindrical carrier drum and guide means capable of radially outward movement secured to the central region of the diaphragm for accurately controlling in a predetermined manner the axial position of the bag with respect to the carrier drum.

2. An apparatus according to claim 1 wherein the guide means comprises a plurality of radially extending pins mounted in the carrier drum and attached to the diaphragm at the radially outer end of each pin.

3. An apparatus according to claim 2 wherein the pins slide in bearings in the carrier drum.

4. An apparatus according to claim 2 wherein the pins are variable length pins.

5. An apparatus according to claim 4 wherein the variable length pins each comprise co-operating telescopic tubes.

6. An apparatus according to claim 2 wherein the pins are located entirely within a pressure vessel formed by the inflatable bag and carrier drum.

7. An apparatus according to claim 6 wherein the pins extend through the carrier drum to outside the pressure vessel and seal means are provided between the pins and the carrier drum.

8. An apparatus according to claim 1 wherein the inflatable diaphragm is substantially wider than the component to be expanded and the inflatable bag includes in the regions outside its component holding region additional annular strips of reinforcement material to restrict radial expansion of the bag and cause the bag to expand rapidly at the centre of the component holding region.

9. An apparatus according to claim 8 wherein the additional reinforcement material comprises in such outer region a strip of steel tire cord fabric.

* * * * *